United States Patent [19]
Bard et al.

[11] 3,906,283
[45] Sept. 16, 1975

[54] ELECTROCHEMICAL LUMINESCENT SOLUTIONS AND DEVICES INCORPORATING SUCH SOLUTIONS

[75] Inventors: Allen J. Bard; Csaba Peter Keszthelyi, both of Austin, Tex.

[73] Assignee: Bell-Northern Research Ltd., Canada

[22] Filed: Sept. 6, 1973

[21] Appl. No.: 394,640

[52] U.S. Cl. ............... 313/483; 313/358; 313/484; 252/188.3 CL; 313/514
[51] Int. Cl.² ..................... H01J 1/62; H01J 63/04
[58] Field of Search ............ 313/108 A, 108 B, 358, 313/483, 496, 503, 504, 484; 317/230; 315/246; 252/188.3 CL

[56] References Cited
UNITED STATES PATENTS

| | | | |
|---|---|---|---|
| 2,878,394 | 3/1959 | Koury | 313/108 A X |
| 3,319,132 | 5/1967 | Chandross et al. | 313/358 X |
| 3,391,068 | 7/1968 | Rauhut | 313/358 |
| 3,391,069 | 7/1968 | Rauhut et al. | 313/108 R |
| 3,399,328 | 8/1968 | Zweig | 313/108 R |
| 3,403,296 | 9/1968 | Zweig | 313/358 X |
| 3,654,525 | 4/1972 | Maricle | 313/358 |
| 3,709,821 | 1/1973 | Yoshimura | 317/230 |
| 3,816,795 | 6/1974 | Maricle et al. | 315/246 |
| 3,868,534 | 2/1975 | Pighin et al. | 313/483 |

*Primary Examiner*—Saxfield Chatmon, Jr.
*Attorney, Agent, or Firm*—Craig & Antonelli

[57] ABSTRACT

In electrogenerated chemiluminescent solutions, the luminescor component comprises a luminescor with which is combined a further compound. The further compound may or may not be a luminescor of itself. In the redox reaction in the cell the luminescor provides one of the radical forms, e.g. anion or cation, while the further compound provides the other form, e.g. cation or anion. Improved efficiency is obtained and also a wider choice of luminescors becomes available.

34 Claims, 2 Drawing Figures

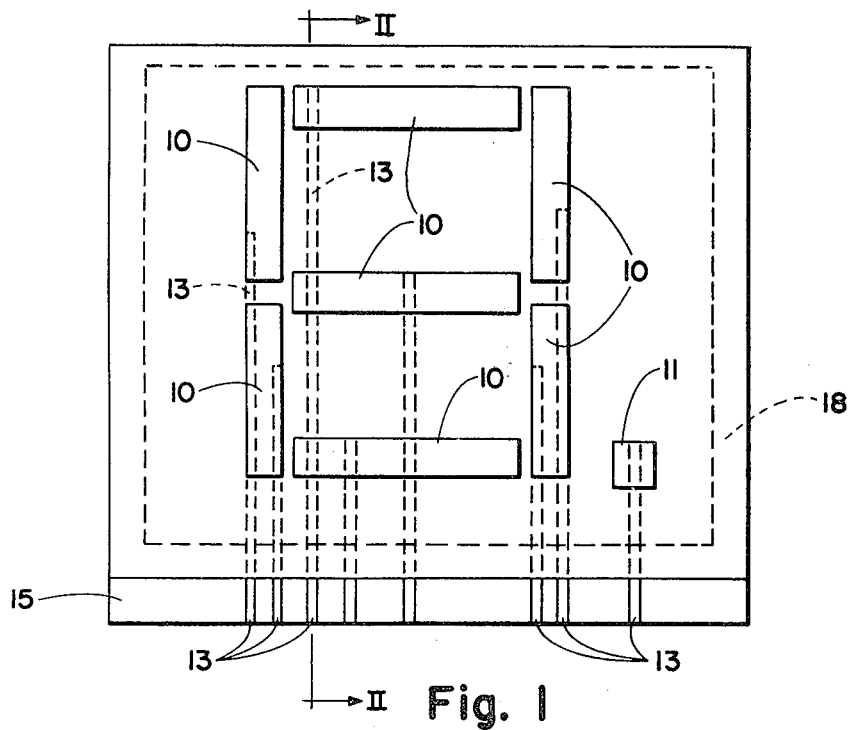
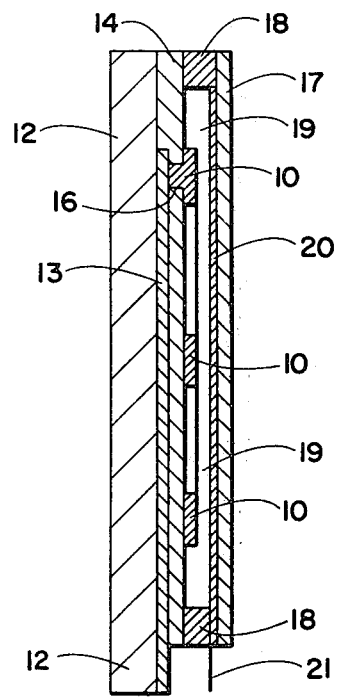

ELECTROCHEMICAL LUMINESCENT SOLUTIONS AND DEVICES INCORPORATING SUCH SOLUTIONS

This invention relates to electrochemical luminescent solutions and to devices incorporating such solutions. In particular this invention relates to luminescors for such solutions and devices.

Electrochemical luminescence, or as sometimes referred, electro-generated chemiluminescence, and referred to respectively as ECL or EGCL for brevity, is a means for converting electrical energy into light, at low voltages. For effective use, EGCL devices must be stable —that is have a useful length of light emitting life— and also have a high enough intensity or luminance to be seen in a wide variety of conditions.

Hitherto, EGCL devices, generally referred to as cells, have not been sufficiently stable in that the light emission is reduced fairly quickly. The present invention provides for a device having a long stable operating life and good luminance, together with increased efficiency.

EGCL is produced from a conductive solution, usually composed of a luminescor, a solvent for the luminescor, and an electrolyte to make the solution electrically conducting. The present invention is concerned with the luminescor component of the solution. Broadly the invention provides a luminescor component in which the luminescor is combined in the solution with a further compound. On application of a suitable potential, a redox reaction proceeds resulting in the emission of light. In the reaction, the oxidized form of one component, ie. luminescor or additive, reacts with the reduced form of the other component, ie. additive or luminescor, as the case may be. Thus, for example an anion radical of the luminescor reacts with a cation radical of the further compound, or alternatively the cation radical of the luminescor reacts with the anion radical of the further compound.

The invention will be readily understood by the following description of an embodiment, by way of example, in conjunction with the accompanying drawings, in which:

FIG. 1 is a plan view of one form of cell, as an example only; and

FIG. 2 is a cross-section on the line II-II of FIG. 1.

As previously stated, EGCL is produced from a conductive solution, usually composed of a luminescor, a solvent for the luminescor, and an electrolyte to make the solution electrically conducting although it is possible to provide solutions which are conductive without the specific addition of an electrolyte. Generally, for most devices, the intensity of EGCL is directly proportional to the concentration of the luminescor. However a practical limit is set by the solubility of the luminescor in the solvent. Often this solubility sets a low limit to the luminescor concentration and thus to the light emission. Luminescors having relatively high solubility are known but at present such known luminescors have disadvantages which make them unsuitable, for example lack of stability.

In accordance with the present invention improved light emission is obtained by using a luminescor comprising two components. One of the components is itself usually a luminescor material and the other an additive. The additive can itself be a luminescor material. As a particular feature, one of the components is an aromatic hydrocarbon compound.

As a further feature of the invention, it is possible to use a luminescor which has desirable characteristics but has one of the ion radicals which would normally be used in the reaction produced in an unstable form. Such a luminescor can be used by providing as the additive a further compound which negates or offsets the instability of such a luminescor. This is obtained for example, by the addition of a compound which is stable in that charged state in which the luminescor is unstable, the additive compound having a reduction or oxidation potential of the desired stable state which is lower than that of the unstable state of the luminescor. For example, taking compound A as the desired luminescor and compound B as the additive, if A has an unstable anion radical, B should be selected to yield a stable anion radical at a potential lower than that at which the unstable anion radical of A is produced, and conversely if A has an unstable cation radical B should yield a stable cation radical at a lower potential than the unstable cation radical of A.

Again the use

In the production of light by EGCL a redox reaction takes place. As previously stated, the oxidized form of one component reacts with the reduced form of the other. In systems using solutions in accordance with the present invention the change in enthalpy of the reaction is greater than the change in energy of the emiting species, or component. Or, more specifically, the change in enthalpy of the ion radical charge annihilation reaction is greater than the energy of emission. Such systems are known as energy sufficient systems, and referred to as such hereinafter. The oxidized form may come from the luminescor component and the reduced form from the additive component. Alternatively it may be the reverse.

An alternative way of describing such a system is that the absolute sum of the oxidation and reduction potentials of the luminescor component and additive component minus their change in entropy term, exceeds the energy of the emitting species or component.

More specifically, the luminescor compound —or luminescent portion of the cell solution— is composed of (a) a luminescor and (b) any compound which yields a redox reaction with (a), the change in enthalpy of the reaction of the appropriate ion radicals of (a) and (b) being greater than the lowest excited singlet or triplet energy state of (a), as the case may be depending upon the particular luminescor.

The reaction can be defined in other ways. Thus, for example, it can be expressed as:

$$-\Delta H^\circ = nF[E_{ox}^\circ - E_{red}^\circ] - T\Delta S^\circ$$

in which:

| | | |
|---|---|---|
| $-\Delta H^\circ$ | = | change in enthalpy of the hetrogeneous electron transfer reaction; |
| $n$ | = | number of electrons involved in the redox of the two components (a) and (b) [this is normally 1]; |
| $F$ | = | The Faraday constant; $\dfrac{(96500 \text{ coulombs})}{\text{mole}}$ |

$E_{ox}°$ = the standard electrode potential of the oxidized species;
$E_{red}°$ = standard electrode potential of the reduced species;
$T$ = temperature, °K
$\Delta S°$ = change in the standard entropy of the redox reaction.

In some cases, the reaction can be presented as:

$$-\Delta H° > 1_L^* \text{ or } 3_L^*$$

in which:   $-\Delta H°$ = change in enthalpy of the heterogeneous electron reaction
$1_L^*$ = energy of the lowest excited singlet state of the luminescor, and
$3_L^*$ = energy of the lowest excited triplet state of the luminescor, if that state emits.

and that is to say that the change in enthalpy of the redox reaction is greater than the change in energy of the emitting species.

There are various examples of mixed luminescor components.

A particularly effective luminescor component is 9,10-Diphenylanthracene (DPA) and thianthrene (TH), in which DPA acts as the luminescor, or emitting species, and TH as the additive although some emission may come from the TH. DPA is an aromatic hydrocarbon and TH is a hetrocyclic compound. DPA provides the negative ion radical and TH the positive ion radical. Other examples of mixed luminescor components are: 9,10-dimethylanthracene, (DMA) reacted with TH, the DMA providing the negative ion radical, TH providing the positive ion radical, and DMA being the luminescor; TH reacted with 2,5-bis[5-tert-butylbenzoxazolyl] (2) thiophene (BBOT) or PPO with TH being the luminescor.

In a solution having the luminescor compound comprised of DPA and TH it has been found that the redox reaction between DPA⁻ (anion radical of DPA) and TH⁺ (cation radical of TH) is approximately three times more efficient than with DPA alone as the luminescor. (Efficiency is expressed as photons emitted per Faradaic electron generating DPA⁻).

Other examples of luminescors are 9-methylanthracene (9MA); and anthracene. Typical further examples of additives are tri-p-tolylumine (TPTA) and phenothiazine. The mixture of BBOT and TH is an example of the use of a material as a luminescor in which the luminescent component —BBOT— produces only one ion radical, in this instance an anion. The TH produces the cation to enable the reaction to take place.

As has been stated, the invention makes possible the use of luminescor materials which produce a stable ion radical and an unstable ion radical. Often luminescors which produce both ion radicals in a stable form in some solvents will produce one of the ion radicals in an unstable form in other solvents. However, by the use of a suitable additive, which will produce a stable form of the ion radical produced in unstable form by the luminescor, and at a lower potential, the choice of luminescors and of solvents, is considerably enlarged.

Thus, for example, while DMA will produce both ion radicals in a stable form in some solvents it will produce an unstable cation in other solvents. TH will produce a stable cation at a potential lower than that at which the unstable DMA cation is produced. This enables DMA to be used as a luminescor in these other solvents with a successful light emitting reaction. Another example of a luminescor which produces an unstable ion in a solvent is DPA in N,N-Dimethylformamide (DMF). In DMF, DPA produces an unstable cation, TH can be added to produce the stable cation. DPA will produce a stable cation in conducting acetonitryle.

An EGCL solution, as stated, in addition to the luminescor (plus added compound in the present invention), also includes a solvent, and usually an electrolyte. The electrolyte, when provided, should be electroinactive at the operative potential of the cell and is usually organic. There are several suitable electrolytes and typical examples are: tetra-n-butylammonium perchlorate (TBAP) or other alkyl derivatives; tetraalkylammonium p-toluene-solfonates; and tetraalkylammonium tetrafluoborates. The solvents are aprotic solvents and typical examples are: acetonitrile and DMF. Mixed solvents provide for an increase in efficiency, additives to the solvent being benzene, toluene or the xylenes for example.

Typical electrodes are of noble metal, such as a platinum, and palladium. Conductive oxides, such as tin oxide and indium oxide can also be used.

A particular solution is one composed of DPA as the luminescor with TH as the added compound; TBAP as the electrolyte and a mixed solvent of acetonitrile:benzene:toluene. The typical proportions of such a solution are 7.77mM DPA and 11.11mM TH in 0.100 M TBAP —3:2:1 acetonitrile:benzene:toluene. It has been found that an EGCL cell using this solution is several times more efficient than many previous systems. As an example of the advantages in using an added compound with the luminescor, when TH was added to DPA, in the proportions given above, an increase in efficiency of approximately 3 times (300%) was obtained. Using a mixed solvent also gave a further substantial increase in efficiency. In the solution given above, an optimal mixed solvent, with the proportions as given above, gave a further improvement in efficiency of approximately 300% compared to using acetonitrile alone as solvent. The combined effect has resulted in efficiencies of about 20%.

The proportions given above have been found to be the optimum for light varied somewhat, up to the present. Although these proportions can be somewhat, cell efficiency is likely to be reduced. Thus generally at least 1mM of the luminescor is necessary to produce at least some visible light emmission in ambient light conductions. The proportion of the added compound would normally be varied in step with the variation of the luminescor so as to maintain the relative proportions constant.

The various compounds used to prepare the EGCL solution should be prepared by methods which particularly avoid contamination by oxygen and/or water. Thus any preparation of the compounds involving recrystallization should use anhydrous solvents.

FIGS. 1 and 2 illustrate, in a very diagrammatic form, one type of EGCL segmented array cell. In particular, the cell is drawn to an enlarged size in order to show details clearly. The cell in the drawings is for a numerical display array, the array formed by segments 10 in the usual manner. By energizing selected segments any numeral desired can be caused to be visible. A further segment 11 can be provided for a decimal point. The array is built up on a ceramic support plate or substrate 12. The electrical conductor leads 13 for the segments 10 and 11 are deposited or formed on the substrate 12 and a layer of dielectric 14 then applied over the substrate, leaving uncovered only the edge 15 of the substrate at which the leads 13 emerge. Holes 16 are formed through the dielectric layer 14 at positions relating to the corresponding segment positions and then electrode material, for example platinum, is deposited to form the array segments 10 and 11. The electrode material contacts with the leads 13 via the holes 16. A cover 17 of glass is then positioned over the array, spaced by a thin spacer 18, for example of polyethylene. The glass cover 17, spacer 18 and dielectric covered substrate 12 are bonded together to form a closed container. The space 19 is filled with a solution, for example as detailed above, that is a 3:2:1 acetonitrile:benzene:toluene solvent, TBAP as electrolyte and DPA-TH as fluorescor. The glass cover has a transparent electrode 20 applied to its inner surface and an electrical leads 21 is connected to this electrode. The electrode 20 is of tin oxide for example and is shown more exaggerated in thickness in FIG. 2.

In a modified form of cell, not illustrated, both electrodes can be formed on the same support plate. In an array as in FIG. 1, for example, it is possible to form the counter electrode, the electrode 20 in FIG. 2, on the substrate 12. This electrode would be, for example, in the spaces bounded by the segments 10, with small isolating gaps between the segments and counter electrodes.

The array illustrated in the drawing is only one example of an EGCL cell. Such cells can be very large and have a very complex array or pattern of display matter. The materials of a cell are relatively cheap and large units can economically be made. In addition to small units such as can be used for displaying information and the like for calculators and other similar apparatus, large units can be made for the display of, for example, advertising matter, progression flow charts in processing plants and other material.

A typical driving voltage for a device as in FIGS. 1 and 2 is 4 volts peak to peak. For a device as illustrated, having a size approximately ⅓ inch square, the current is approximately 1 milliamperes.

What is claimed is:

1. In an electrochemical luminescent solution for an electro-generated chemiluminescent device, said solution including a luminescor component, an aprotic solvent and an electrolyte, the improvement wherein the luminescor component comprises a luminescor compound and an added compound, one of said compounds an oxidant and the other of said compounds a reductant at the operating potential of said device, said oxidant and reductant reactive as an energy sufficient system for light emission.

2. In an electrochemical luminescent solution as claimed in claim 1, one of said compounds productive of an anion radical and the other of said compounds productive of a cation radical, said radicals reactive as an energy sufficient system for light emission.

3. An electrochemical luminescent solution for an electro-generated chemiluminescent device, said solution electrically conductive and comprising an aprotic solvent, an electrolyte and a luminescor component, said luminescor component comprising a luminescor compound and an additive compound, one of said compounds an oxidant and the other of said compounds a reductant at the operating potential of said device, said oxidant and said reductant reactive as an energy sufficient system for light emission.

4. A solution as claimed in claim 3, one of said compounds productive of an anion radical and the other of said compounds productive of a cation radical, said radicals reactive as an energy sufficient system for light emission.

5. A solution as claimed in claim 4, one of said compounds an aromatic hydrocarbon.

6. A solution as claimed in claim 5, one of said compounds DPA.

7. A solution as claimed in claim 5, the other of said compounds a hetrocyclic compound.

8. A solution as claimed in claim 6, the other of said compound thianthrene.

9. A solution as claimed in claim 8 wherein said solvent is a mixed solvent.

10. A solution as claimed in claim 9, said mixed solvent comprising acetonitrile, benzene and toluene.

11. A solution as claimed in claim 9, the electrolyte an organic electrolyte.

12. A solution as claimed in claim 4, said luminescor component comprising a luminescor compound productive of a stable ion radical and an unstable ion radical, said additive compound productive of a stable ion radical corresponding to said unstable ion radical, said stable ion radical of said additive compound produced at a potential lower than that for said unstable ion radical.

13. An electrogenerated chemiluminescent device comprising a substrate and a transparent cover member spaced from said substrate and defining with said substrate a sealed chamber; first and second electrodes in said chamber, one of said electrodes defining at least one predetermined pattern; an electrochemical luminescent solution in said chamber in contact with said electrodes; and means for applying an operating potential to said electrodes, said solution electrically conductive and including a luminescor component, an electrolyte and an aprotic solvent for the luminescor component, the luminescor component comprising a luminescor compound and an additive compound, one of said compounds an oxidant and the other of said compounds a reductant at the operating potential of the device, the oxidant and reductant reactive as an energy sufficient system for light emission.

14. An electrochemiluminescent solution including:
an electrochemiluminescent compound being reducible and oxidizable by an applied alternating electric potential to a compound anion radical and a compound cation radical, one of the compound ion radicals being less stable than the other,
an additive compound capable of producing a stable additive ion radical corresponding to and more stable than the less stable compound ion radical of said electrochemiluminescent compound at a potential lower than the potential at which said less stable compound ion radical is formed, whereby the corresponding additive compound ion radical is formed in preference to the less stable electrochemiluminescent compound ion radical under the influence of said alternating potential, the more stable ion radical of said electrochemiluminescent compound and the preferentially formed stable additive compound ion radical capable of directly producing upon reaction together a change in enthalpy greater than the lowest excited singlet state of said electrochemiluminescent compound, whereby an electronically excited molecule of said electroluminescent compound is formed which emits light on returning to its ground state, an electrolyte, and an aprotic solvent for said electrochemiluminescent compound.

15. The solution of claim 14, wherein said electrochemiluminescent compound and said additive compound are so selected that said electrochemiluminescent compound in its excited state emits visible light.

16. The solution of claim 15, wherein the electrochemiluminescent compound and the additive compound are so selected that the more stable ion radical of the electrochemiluminescent compound and the preferentially formed stable additive compound ion radical are capable of directly producing upon reaction together a change in enthalpy greater than the lowest excited singlet state of said electrochemiluminescent compound, whereby said electrochemiluminescent compound is formed in its lowest excited singlet state and thereby emits light.

17. The solution of claim 16, wherein said electrochemiluminescent compound is selected from the group consisting of 9,10-diphenylanthracene, 9,10-dimetnylanthracene, 9-methylanthracene and anthracene.

18. The solution of claim 17, wherein said additive compound is selected from the group consisting of thianthrene, tri-p-tolylamine and phenothiazine.

19. The solution of claim 18, wherein said additive compound is thianthrene and wherein said electroluminescent compound is selected from the group consisting of 9,10-diphenylanthracene, and 9,10-dimethylanthracene.

20. The solution of claim 19, wherein said electroluminescent compound is 9,10-diphenylanthracene.

21. The solution of claim 15 wherein said electrolyte is electroinactive at said applied alternating electric potential.

22. The solution of claim 21, wherein said electrolyte is selected from the group consisting of tetraalkylammonium perchlorates, tetraalkylammonium p-toluenesulfonates and tetraalkylammonium tetrafluoroborates.

23. The solution of claim 21, wherein said aprotic solvent is selected from the group consisting of acetonitrile and dimethylformamide.

24. The solution of claim 21, wherein said solvent is selected from the group consisting of benzene, toluene, and xylene.

25. The solution of claim 24, wherein said solution contains acetonitrile, benzene and toluene.

26. The solution of claim 25, wherein the proportion of acetonitrile:benzene:toluene is 3:2:1 on a volume basis.

27. The solution of claim 25, wherein the proportion of acetonitrile:benzene:toluene is 3:2:1 on a volume basis, said electroluminescent compound being 9,10-diphenylanthracene, said additive compound being thianthrene, said electrolyte being tetra-n-butylammonium perchlorate, said solution containing about 11.11 millimoles thianthrene, 7.77 millimoles 9,10-diphenylanthracene, and about 0.1 moles tetra-n-butylammonium perchlorate per liter of said solution.

28. The solution of claim 15, wherein said electroluminescent compound is 9,10-diphenylanthracene and wherein said additive compound is thianthrene, said solution containing about 11.11 millimoles thianthrene, about 7.77 millimoles 9,10-diphenylanthracene, and about 0.1 moles tetra-n-butylammonium perchlorate per liter of said solution, said solution further including acetonitrile as a solvent.

29. The solution of claim 15 comprising PPO and TH.

30. The solution of claim 15 comprising 9,10-dimethylanthracene and thianthrene.

31. An electroluminescent solution including:

an electrochemiluminescent compound being reducible and oxidizable by an applied alternating electric potential to an anion radical and a cation radical less stable than said anion radical, an additive compound capable of producing a stable additive compound cation radical more stable than the cation radical of said electrochemiluminescent compound at a potential lower than the potential at which the cation radical of said electrochemiluminescent compound is produced, whereby the stable additive compound cation radical is formed in preference to the less stable electrochemiluminescent compound cation radical under the influence of said alternating potential, the anion radical of said electrochemiluminescent compound and the preferentially formed stable additive compound cation radical capable of directly producing upon reaction together a change in enthalpy greater than the lowest excited singlet state of said electrochemiluminescent compound, whereby said electrochemiluminescent compound is formed in an excited electronic state and thereby emits light, an electrolyte, and an aprotic solvent for said electrochemiluminescent compound.

32. An electrochemiluminescent solution including:

an electrochemiluminescent compound capable of producing under the influence of an applied alternating electric potential only one ion radical, an additive compound capable of producing under the influence of said applied alternating electric potential a stable additive compound radical having an electrical charge opposite the electrical charge of the electrochemiluminescent compound ion radical, the electrochemiluminescent compound ion radical and the stable additive compound ion radical capable of directly producing upon reaction together a change in enthalpy greater than the lowest excited singlet state of said electrochemiluminescent compound, whereby said electrochemiluminescent compound is formed in an electronically excited state and returns to its ground state with the emission of light, an electrolyte, and an aprotic solvent for said electroluminescent compound.

33. The solution of claim 31, wherein said electrochemiluminescent compound is capable of producing an anion radical under the influence of said applied alternating electric potential but not a cation radical.

34. The solution of claim 30, wherein said electrochemiluminescent compound is 2,5-bis[5-tert-butylbenzoxazolyl] (2) thiophene, and further wherein said additive compound is thianthrene.

* * * * *